Figure 1:
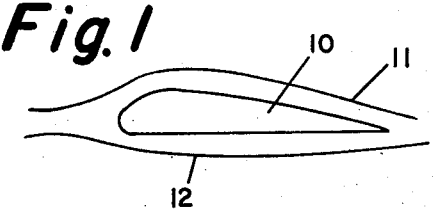

Sept. 22, 1964  C. J. LITZ, JR  3,149,804
ANTI-STALL SYSTEM

Filed March 13, 1963  2 Sheets-Sheet 1

INVENTOR.
CHARLES J. LITZ, JR
BY Harry M. Saragovitz,
Edward J. Kelly, Herbert Berl &
S. Pubroff
ATTORNEYS.

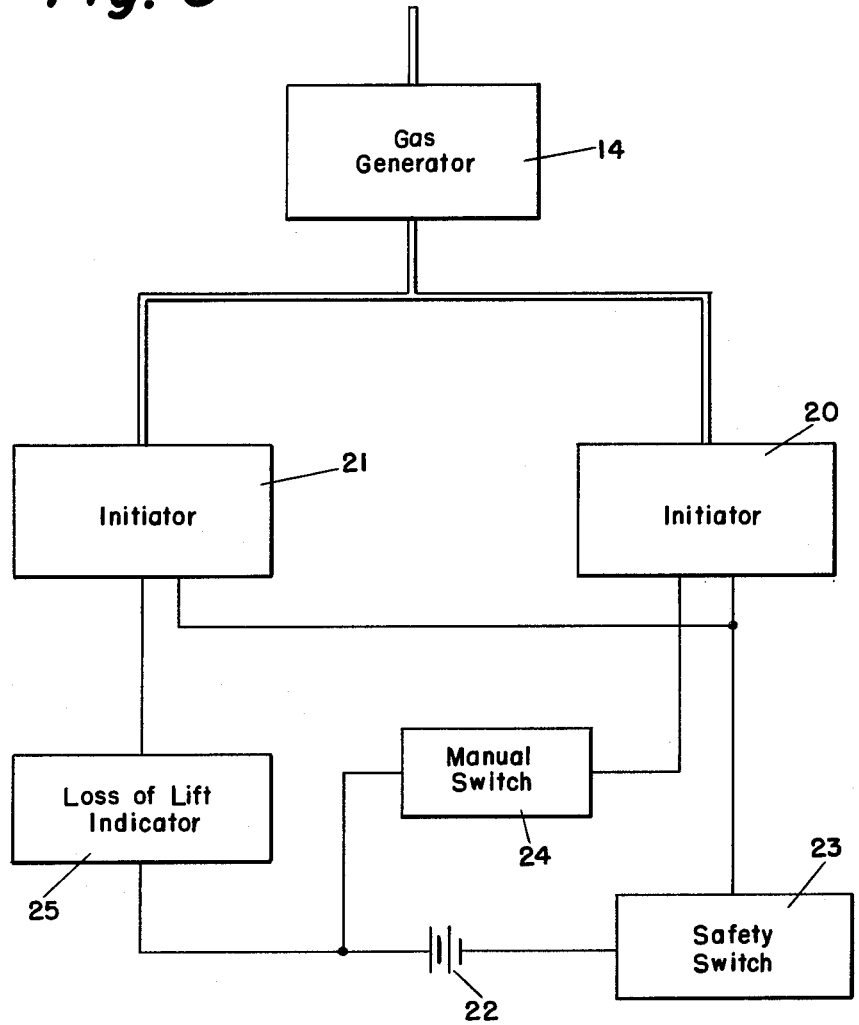

3,149,804
ANTI-STALL SYSTEM
Charles J. Litz, Jr., Philadelphia County, Pa.
(520 W. Eleanor St., Philadelphia, Pa.)
Filed Mar. 13, 1963, Ser. No. 265,319
2 Claims. (Cl. 244—42)
(Granted under Title 35, U.S. Code (1952), sec. 266)

The invention described herein may be manufactured and used by or for the Government for governmental purposes without the payment to me of any royalty thereon.

This invention relates to systems for improving the safe flight characteristics of aircraft at take off, at landing and wherever incipient stalling is encountered.

The lift of an aircraft wing or airfoil in the normal flight of an aircraft is dependent on the relative flow of air over its surface as the aircraft is propelled forward. When the velocity of the aircraft is decreased, however, the attack of the airfoil must be increased in order to maintain the required amount of lift. If the velocity of the aircraft decreases to a point where an increase in the angle of attack no longer results in sufficient lift, stalling is encountered. At this angle of attack, the resulting turbulence has destroyed the laminar layer of air, resulting in the loss of lift.

Heretofore various types of aerodynamic or pumping devices have been proposed or utilized to maintain a turbulence-free smooth flow of air when the angle of attack is at a maximum as at take off and landing. Some of these aerodynamic devices have involved the use of fixed or movable nose slots. Others have utilized an aileron or trailing edge portion. All of these devices whether automatic, aerodynamic or mechanic have been less than completely satisfactory for the reason that their operation involves mechanical adjustments, which require time and are not always effective in time to prevent stall when finally completed. This is so for the reason that loss of lift occurs in a period of the order of 0.2 sec.

The present invention provides a system which functions instantaneously or within a period of 0.1 sec. to maintain a turbulence free smooth flow of air when the angle of attack is at a maximum and stall is imminent or actual. In the operation of this system, aid is instantly *drawn in* or *blown out* at the appropriately demonstrated aerodynamic locations through perforations distributed about the upper surface of the airfoil or, wing of the aircraft and is discharged near the leading and/or trailing edge of the airfoil. This action causes the laminar layer to be reattached and to adhere to the upper surface of the airfoil. As a result, stalling is corrected and the forward speed of an airborne aircraft can be reduced safely during take-off and landing without the present hazards of loss of adequate sustaining lift.

As will appear, outstanding features of the present invention are (1) means for applying a high energy gas to aerodynamically located apertures and/or an ejector (2) aerodynamically distributed perforations as slots or holes in the upper surface of the airfoil, (3) ejector means so located within the airfoil as to draw air into the airfoil through these perforations, or blow gas out near leading and trailing edges. Obviously to those versed in ballistic arts this gas may be supplied from a propellant or cartridge actuated generator which supplies high energy gas for operating other devices aboard military aircraft or may be supplied from a separate cartridge actuated gas generator. In either case, the kinetic energy of the gas delivered from the cartridge actuated gas generator functions through the ejector to such air through the perforations into the airfoil and to discharge it near the airfoil's trailing edge or conversely blow high pressure gas through slots at nose or tail portions of upper surface of airfoil in either case reattaching laminar flow.

The invention will be better understood from the following description when considered in connection with the accompanying drawings and its scope is indicated by the appended claims.

Figure 2:
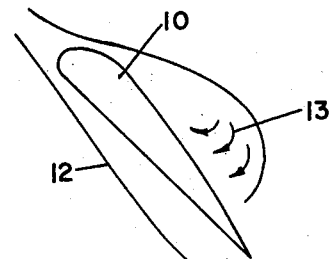
Figure 3:
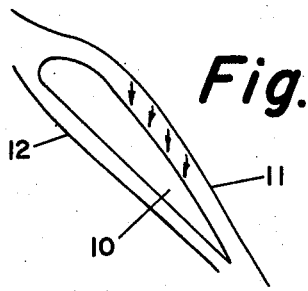
Figure 4:
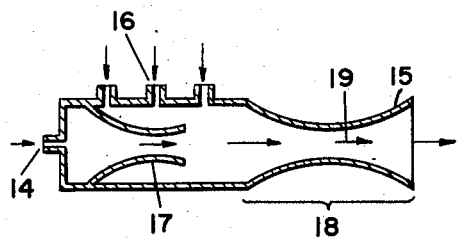
Figure 5:
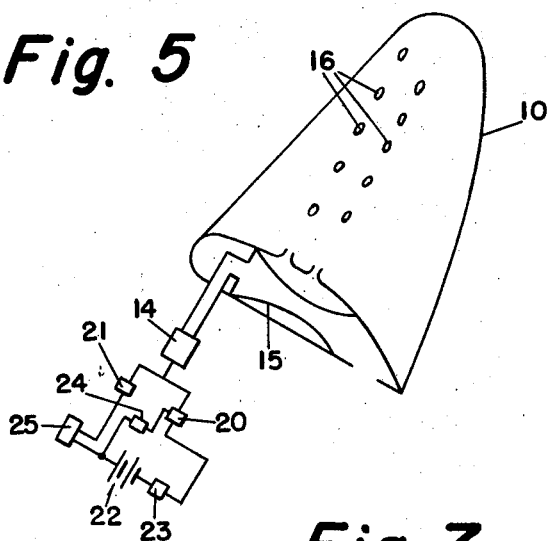
Figure 6:
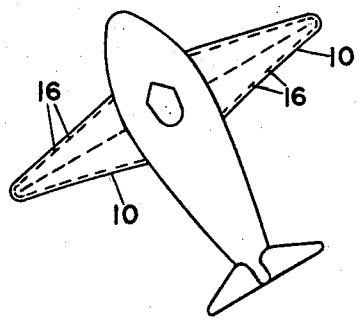
Figure 7:
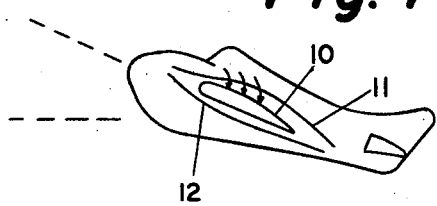

Referring to the drawings:

FIG. 1 indicates the air flow about an airfoil during normal flight,

FIG. 2 indicates the air flow about an airfoil at a maximum angle of attack where the resulting turbulence has destroyed the laminar layer of air resulting in loss of lift, FIG. 3 illustrates how the turbulence exhibited by FIG. 2 is counteracted by drawing air into the airfoil through the perforations in its upper surface and discharging it near the rear edge of the airfoil, FIG. 4 is a sectional view of an ejector suitable for drawing the air into the airfoil utilizing energy released by a propellant, FIG. 5 is a partial section of an airfoil illustrating the relation between the various parts of the present anti-stall suction system, FIGS. 6 and 7 are top and side views of an aircraft equipped with this suction system, and FIG. 8 illustrates various details of the propellant gas generator control system.

FIG. 1 shows an airfoil 10 as it is positioned in normal flight. In this position, there is a circulation of air flow 11 above the airfoil and an air flow 12 below it according to Dr. Prandtl and the resulting lift maintains the aircraft on course so long as it is propelled forward with creases, however, the angle of attack of the airfoil must be increased in order to maintain the required amount of sufficient force. When the velocity of the aircraft de- lift. If the velocity of the aircraft decreases to a point where an increase in the angle of attack no longer produces sufficient lift, or the angular attitude of the aircraft exceeds that of maximum lift coefficient the airfoil is said to be in a "stalled" position. At this angle of attack, the resulting turbulence 13 (FIG. 2) has destroyed the laminar layer of air flow, resulting in the loss of lift.

The present system obviates this difficulty by sucking air into the airfoil through its perforated upper surface as indicated by FIG. 3 or blowing high pressure gas through appropriately and aerodynamically placed apertures near nose and trailing edges. This action causes the laminar flow of air to reattach and adhere to the surface of the airfoil, thereby eliminating the turbulence of discontinuous flow and resulting in smooth reattached flow lines.

This stabilizing flow of air through the interior of the airfoil is effected by an ejector 15 such as that illustrated by FIG. 4. This ejector has an input which is connected to a source of high energy gas such as the propellant gas generator 14 commonly utilized on military aircraft for a variety of purposes. The ejector 15 may be centrally disposed in the airfoil profile of the aircraft, may be located at approximately one third or more of the span of the wing panel, and has in its upper surface openings 16 which mate with similar openings on the upper surface of the airfoil. Located within the ejector 15, and coextensive with the transverse length thereof, is a nozzle 17.

The propellant gas generator 14 includes a plurality of charges. One of these charges is fired by an initiator 20 which is energized by a voltage applied by a battery 22 through a manually operated switch 24 and a safety switch which is normally closed during flight. The other charge of the propellant gas generator 14 is fired by a voltage applied by the battery 22 through a loss of lift indicator 25 and the safety switch 23 to the initiator 21. The relation between these various parts of the control system is indicated by FIG. 8 wherein the gas conductors are represented by double lines and the electrical conductors are indicated by single lines.

In the operation of the system, a high velocity jet of gas is delivered from the nozzle 17 and air is drawn into the ejector through the openings 16. This air mixes with the jet and the mixture is compressed in the diffuser section 18 of the ejector. From the diffuser section, the mixture is discharged into a region of high pressure. The gas is supplied to the nozzle 17 at a pressure considerably higher than the pressure at which the air is discharged. Between the inlet and outlet of the nozzle there is an increase in velocity. Also between the openings 16 and the outlet of the nozzle there is a slight increase in velocity. Between the outlet of the nozzle and some indefinite point further along the gas flow, the gases and air mix at nearly constant pressure and with an increase in air velocity and a decrease in gas velocity. In the diffuser 18, the mixture is compressed with decreasing velocity. The diffuser has a minimum section 19 where the absolute pressure is less than half that at the outlet of the ejector which is located at the trailing edge of the airfoil.

How this circulation of the air-gas mixture through the interior of the airfoil functions to prevent stalling can be seen upon a consideration of Bernoulli's theorem. This theorem states that the energy in any system remains constant. Thus the air flowing past the airfoil 10 forms a circulation system to which the theorem is applicable. The energy in a given air mass is the product of its pressure and velocity. If the energy is to remain constant, it follows that an increase in velocity will produce a decrease in pressure. Thus the air that passes over the airfoil must travel a greater distance than the air flowing under it. Since the two parts of the air-stream reach the airfoil's trailing edge at the same time, the air that flows over the airfoil must move faster than the air that flows under it. In accordance with Bernoulli's theorem, and Dr. Prandtl's circulation flow this results in a lower pressure on the top than on the bottom of the airfoil. This pressure differential tends to force the airfoil upward giving it a lift which counteracts stalling. This invention conceives a unique means of application of propellant energy, within the airfoil, to exaggerate or augment, thru combination of energy added to normal aerodynamic phenomenae to control the circulation flow and thus prevent stall.

As can be readily understood by those skilled in the ballistic and aerodynamic arts, the use of a cartridge actuated ejector to produce this pressure differential, has the important advantage that a cartridge operated gas generator is already available as a part of the normal equipment of military aircraft and ready to function upon demand. It has been established that loss of lift involves a time of about 0.2 second and that the present invention restores lift in approximately 0.1 second. Such instant response is highly desirable and uniquely applicable in the split-second catastrophic situation encountered in a stall emergency and has not been realized in the operation of the areodynamic and mechanical anti-stall systems heretofore available.

A fail-safe, ultra reliable means for the instantaneous recovery of lift has long been sought. For this purpose, fixed and movable nose slots, and trailing edge portion slots and flaps have been utilized with something less than completely satisfactory results. The utilization of a combination of ballistic, mechanical and aerodynamic phenomenae to counteract stalling of an aircraft is a concept not heretofore realized by those skilled in the art. It has the important advantage that (1) the anti-stall power is not drawn from the main power source at a time when it is subjected to an excessively large demand, and (2) this anti-stall power may be applied repeatedly by the successive firing of a plurality of cartridges.

I claim:
1. An aircraft anti-stall system including
    an airfoil having perforations distributed about its upper surface,
    an ejector mounted within said airfoil and having air inlets each interconnected with a different one of said perforations, said ejector having a gas inlet, and
    a cartridge actuated gas generator connected to said gas inlet and operable to supply through said inlet a gas whereby air is drawn into said ejector at a relatively low pressure and is discharged therefrom along the trailing edge of said airfoil at a relatively high pressure.
2. An aircraft anti-stall system including
    an airfoil having leading and trailing edges and having perforations distributed about an upper surface of said airfoil near said edges,
    an ejector mounted within said airfoil and positioned near at least one of said edges and having gas ports each interconnected with a different one of said perforations, said ejector having a gas inlet, and
    a cartridge actuated gas generator connected to said gas inlet and operable to supply through said inlet a gas whereby the discharge of said gas through said perforations tends to promote laminar flow across said airfoil.

References Cited in the file of this patent
UNITED STATES PATENTS

| | | |
|---|---|---|
| 1,513,241 | Harding | Oct. 28, 1924 |
| 2,000,762 | Kraft | May 7, 1935 |
| 2,949,255 | Glasby | Aug. 16, 1960 |
| 3,012,740 | Wagner | Dec. 12, 1961 |

FOREIGN PATENTS

| | | |
|---|---|---|
| 623,049 | Great Britain | May 11, 1949 |